United States Patent
Ajila et al.

(10) Patent No.: US 10,678,482 B2
(45) Date of Patent: *Jun. 9, 2020

(54) MULTI-TIER DATA SYNCHRONIZER BASED ON CONCURRENT LINKED LIST

(71) Applicants: INTERNATIONAL BUSINESS MACHINES CORPORATION, Armonk, NY (US); UNIVERSITY OF NEW BRUNSWICK, Fredericton (CA)

(72) Inventors: Oluwatobi A. Ajila, Ottawa (CA); Eric Aubanel, Fredericton (CA); Kenneth B. Kent, Fredericton (CA); Angela Lin, Kanata (CA); Bing Yang, Fredericton (CA)

(73) Assignee: International Business Machines Corporation, Armonk, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/043,591

(22) Filed: Jul. 24, 2018

(65) Prior Publication Data

US 2018/0329641 A1 Nov. 15, 2018

Related U.S. Application Data

(63) Continuation of application No. 15/420,449, filed on Jan. 31, 2017, now Pat. No. 10,073,646.

(51) Int. Cl.
*G06F 3/06* (2006.01)

(52) U.S. Cl.
CPC ............ *G06F 3/067* (2013.01); *G06F 3/0604* (2013.01); *G06F 3/065* (2013.01)

(58) Field of Classification Search
CPC .... G06F 3/0604; G06F 3/0629; G06F 3/0631; G06F 3/0632; G06F 3/0638; G06F 3/0643; G06F 3/065; G06F 3/0653; G06F 3/067

(Continued)

(56) References Cited

U.S. PATENT DOCUMENTS 8,719,307 B2    5/2014  Surtani et al.
9,021,455 B2    4/2015  Chapman et al.
(Continued)

FOREIGN PATENT DOCUMENTS

CA          2753626 A1      3/2013

OTHER PUBLICATIONS (Grace Period Disclosure) Bing Yang et al, Multi-tier Data Synchronization Based on an Optimized Concurrent Linked-list, Proceedings of the 13th International Conference on Principles and Practices of Programming on the Java Platform: Virtual Machines, Languages, and Tools, Article 9, 2016, entire document, 10 pg.

(Continued)

*Primary Examiner* — Gary J Portka
(74) *Attorney, Agent, or Firm* — Patrick J. Daugherty; Daugherty & Del Zoppo Co. LPA

(57) ABSTRACT

Aspects provide multi-tier data synchronization based on a concurrent linked monitor list. A computer processor associates each of different data regions of a packed data object with different mutual exclusion monitor nodes of a linked list, the data regions defined by a data offset location within memory data and a length of the data region from the offset. In response to determining that a first data region of the packed data object is on-heap memory, the processor associates the first data region with a container representative of the linked list sorted in ascending order of the respective offset values, and a hash code of the container; and in response to determining that a second data region of the packed data object is off-heap memory, stores container information for the second data region in the linked list and resorts the linked-list nodes of container information in ascending order of offset values.

20 Claims, 6 Drawing Sheets

(58) Field of Classification Search
USPC .......................................... 711/154, 170, 171
See application file for complete search history.

(56) References Cited

U.S. PATENT DOCUMENTS

| | | |
|---|---|---|
| 9,141,483 B1 | 9/2015 | Sekar et al. |
| 9,952,797 B2 | 4/2018 | Katiyar et al. |

OTHER PUBLICATIONS

Peter Mell et al, The NIST Definition of Cloud Computing, National Institute of Standards and Technology, Publication 800-145, 2011, entire document, 7 pg.

IBM Knowledge Center, The packed object data model, Version 7.1, 2014, entire document, 3 pg.

R. Bayer et al, Concurrency of Operations on B-Trees, Acta Informatica, 1977, entire document, 1 pg.

Maurice Herlihy et al, The Art of Multiprocessor Programming, PODC, vol. 6, 2006, entire document, 529 pg.

Steve Heller et al, A Lazy Concurrent List-Based Set Algorithm, Proceedings of the Ninth International Conference on Principles of Distributed Systems (OPODIS2005), 2006, entire document, 14 pg.

Tim Lindholm et al, The Java Virtual Machine Specification, Java SE 7 Edition, Oracle America, 2013, entire document, 606 pg.

Michael L. Scott, Shared-Memory Synchronization, Morgan & Claypool, 2013, entire document, 2 pg.

Andrew Hall, IBM, Thanks for the memory, Linux, Understanding how the JVM uses native memory on Windows and Linux, developerWorks, 2009, entire document, p. 2-28.

Yang, "Java Packed Object Synchronization", 197 pgs., 2010. (Year: 2010), entire document.

Yang et al., "Multi-granularity Locking on Multi-tier Data Structures", 1 pg., Mar. 22, 2017. (Year: 2017), entire document.

U.S. Appl. No. 15/420,449, filed Jan. 31, 2017; Confirmation No. 8123.

MULTI-TIER DATA SYNCHRONIZER BASED ON CONCURRENT LINKED LIST

STATEMENT REGARDING PRIOR DISCLOSURES BY THE INVENTOR OR A JOINT INVENTOR

The following disclosure is submitted under 35 U.S.C. 102(b)(1)(A):

DISCLOSURE: "Multi-tier Data Synchronization Based on an Optimized Concurrent Linked-list", authors: Bing Yang, Kenneth B. Kent, Eric Aubanel, Angela Lin and Tobi Ajila, Aug. 29-Sep. 2, 2016, Proceedings of the 13th International Conference on Principles and Practices of Programming on the Java Platform: Virtual Machines, Languages, and Tools, Article No. 9.

BACKGROUND

Java™ applications and frameworks may deal directly with native data, memory that is allocated outside a JAVA heap. (JAVA and all JAVA-based trademarks and logos are trademarks or registered trademarks of Oracle and/or its affiliates.) Examples include operating system data structures, transmitted data, data streamed from a file, and data shared with another application that is not a JAVA application.

A packed object data model offers advantages relative to conventional JAVA programming, including reducing overhead associated with data marshalling, reducing overall memory footprint, and increasing object locality. In the packed object data model fields of primitive data type generally occupy a smallest amount of space necessary. Non-primitive data type fields can use packed types, in which the data is embedded rather than existing in a separate object. Elements of a packed array contain data rather than references to other objects. Packed objects can also contain data that is allocated outside of the JAVA heap.

More particularly, in a packed object data model fields of a primitive data type (for example, "byte" or "int") occupy a minimum amount of necessary space. Thus, "byte" or "boolean" field types generally occupy a single byte; "short" or "char" types occupy two bytes; "int" or "float" types occupy four bytes; and "long" or "double" types occupy 8 bytes. This is in contrast to a standard JAVA object where all primitive data type fields are stored in either 32-bit (for example, "byte, short, int, float, char" and "boolean" data types) or 64-bit format (for example, "long" and "double" data types), which is relatively more wasteful of resources, especially when there are multiple fields of a small primitive data type.

Packed classes may also contain fields of non-primitive data types. For normal object and array types, these fields behave exactly like any other non-primitive data type field in the JAVA language, and wherein the field contains a reference (or a pointer) to either a field value or "null" value. A packed object with one or more fields of this type is sometimes referred to as a "mixed packed object," or "mixed," and is subject to some additional restrictions relative to a standard JAVA data model.

Fields of packed types also behave differently relative to a standard JAVA data model. For example, an instance field of a packed type in a packed class may not result in a reference to another object, but instead to data fields of the embedded type. A field of this type is sometimes referred to as a "nested field," or "nested."

BRIEF SUMMARY

In one aspect of the present invention, a computerized method for multi-tier data synchronization based on a concurrent linked monitor list includes executing steps on a computer processor. Thus, a computer processor associates each of different data regions of a packed data object with different mutual exclusion monitor nodes of a linked list of container information, wherein the data regions are defined by a data offset location of a beginning of each data region within memory data of the packed data object and a length of the data region from the offset location within the memory data of the packed data object. The processor sorts the linked list monitor nodes in an ascending order of their respective offset values; in response to determining that a first of the data regions of the packed data object is on-heap memory, associates the first data region with a container comprising data representative of the sorted linked list, and a hash code of the container data; and in response to determining that a second of the data regions of the packed data object is off-heap memory, stores container information for the second data region in the linked list that comprises the data offset location and the data region length of the off-heap one of the second data region, and resorts the linked-list nodes in an ascending order of their respective offset values. Thus, the processor locks and unlocks the data regions as a function of traversing the sorted linked list nodes of container information associated with the packed data object.

In another aspect, a system has a hardware processor in circuit communication with a computer readable memory and a computer-readable storage medium having program instructions stored thereon. The processor executes the program instructions stored on the computer-readable storage medium via the computer readable memory and thereby associates each of different data regions of a packed data object with different mutual exclusion monitor nodes of a linked list of container information, wherein the data regions are defined by a data offset location of a beginning of each data region within memory data of the packed data object and a length of the data region from the offset location within the memory data of the packed data object. The processor sorts the linked list monitor nodes in an ascending order of their respective offset values; in response to determining that a first of the data regions of the packed data object is on-heap memory, associates the first data region with a container comprising data representative of the sorted linked list, and a hash code of the container data; and in response to determining that a second of the data regions of the packed data object is off-heap memory, stores container information for the second data region in the linked list that comprises the data offset location and the data region length of the off-heap one of the second data region, and resorts the linked-list nodes in an ascending order of their respective offset values. Thus, the processor locks and unlocks the data regions as a function of traversing the sorted linked list nodes of container information associated with the packed data object.

In another aspect, a computer program product for multi-tier data synchronization based on a concurrent linked monitor list has a computer-readable storage medium with computer readable program code embodied therewith. The computer readable hardware medium is not a transitory signal per se. The computer readable program code includes instructions for execution which cause the processor to associate each of different data regions of a packed data object with different mutual exclusion monitor nodes of a linked list of container information, wherein the data regions are defined by a data offset location of a beginning of each data region within memory data of the packed data object and a length of the data region from the offset location within the memory data of the packed data object. The processor is caused to sort the linked list monitor nodes in an ascending order of their respective offset values; in response to determining that a first of the data regions of the packed data object is on-heap memory, associate the first data region with a container comprising data representative of the sorted linked list, and a hash code of the container data; and in response to determining that a second of the data regions of the packed data object is off-heap memory, store container information for the second data region in the linked list that comprises the data offset location and the data region length of the off-heap one of the second data region, and resort the linked-list nodes in an ascending order of their respective offset values. Thus, the processor is caused to lock and unlock the data regions as a function of traversing the sorted linked list nodes of container information associated with the packed data object.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
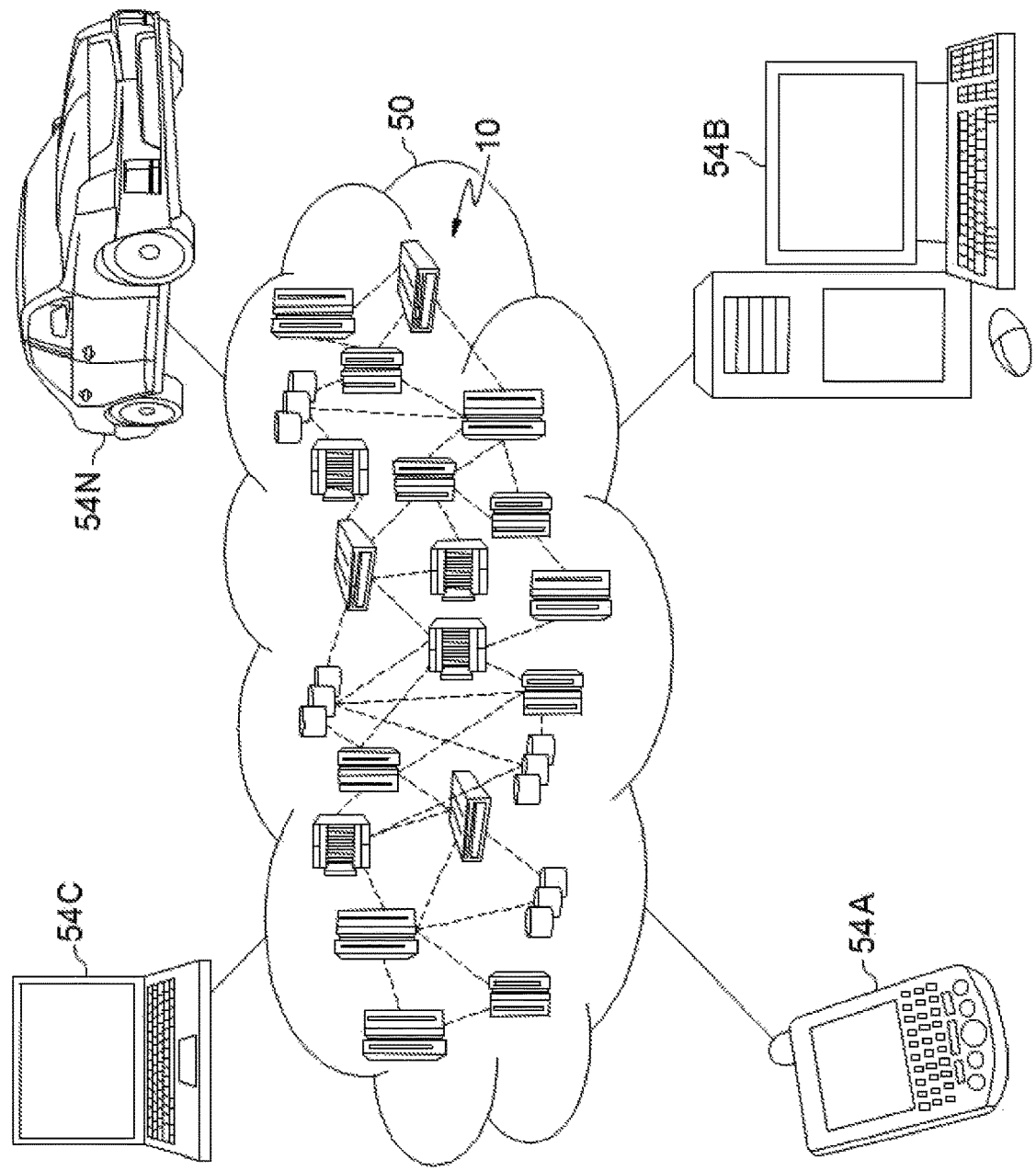
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
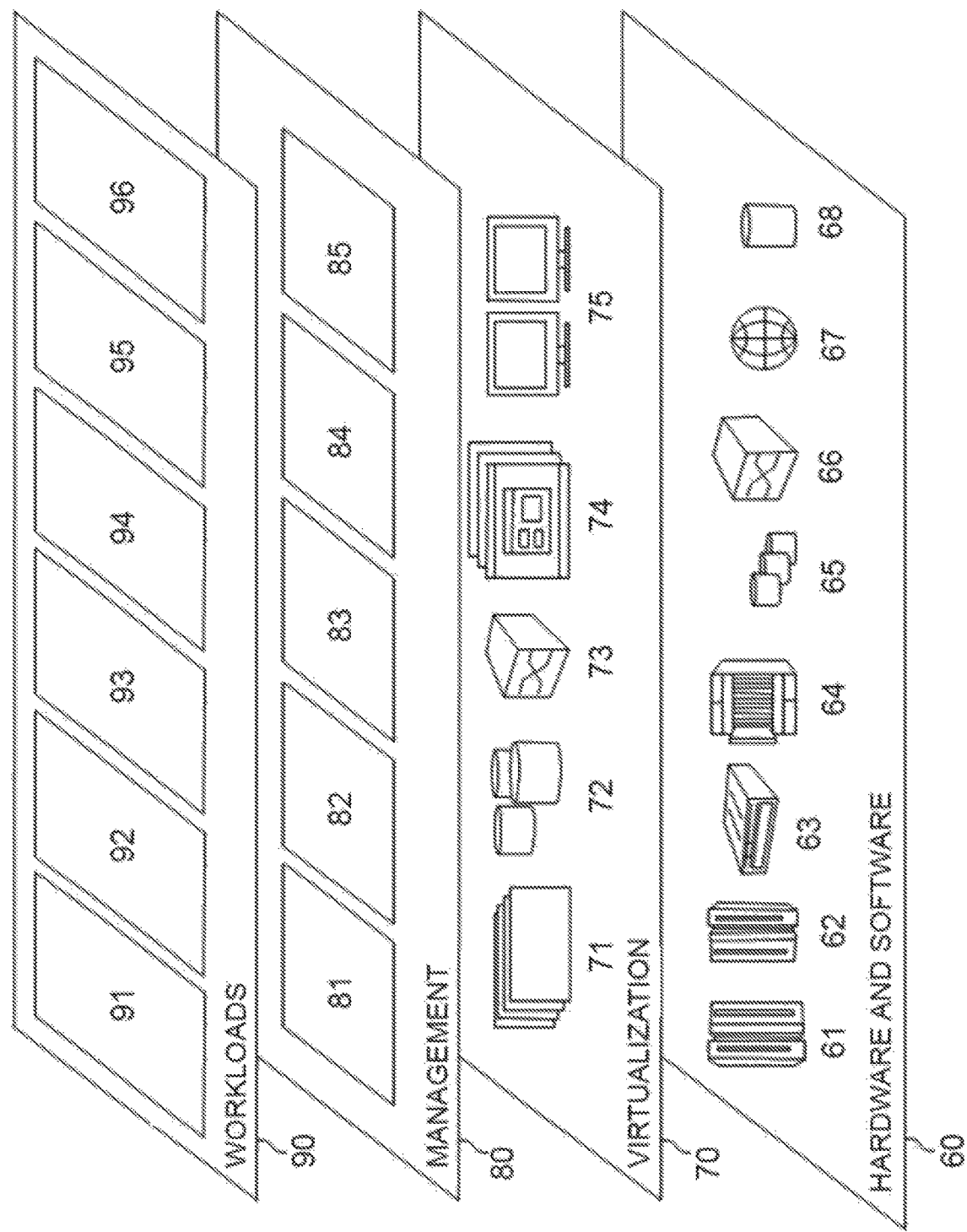
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for multi-tier data synchronization based on a concurrent linked monitor list 96.

Figure 3:
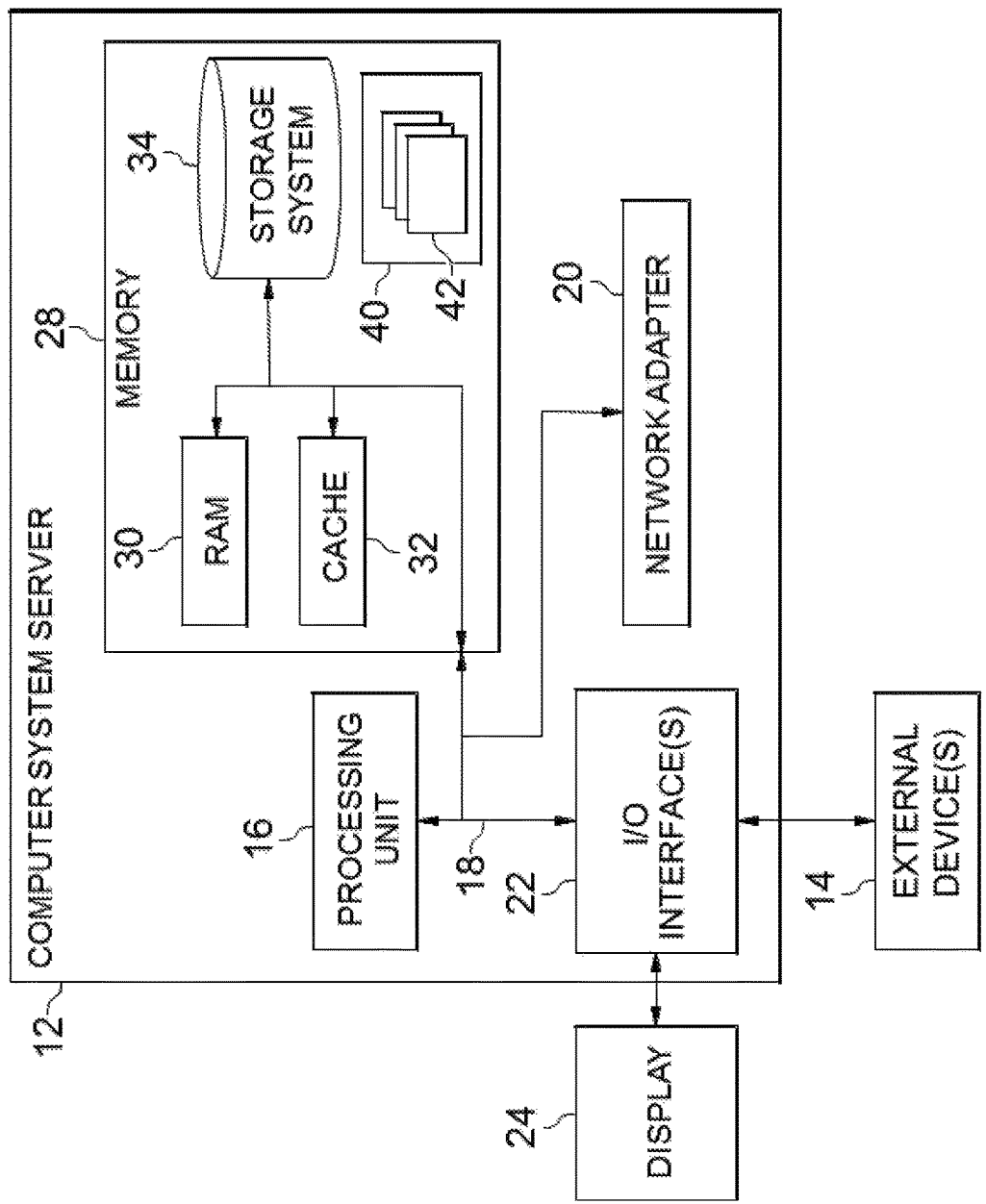
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Synchronization on multi-tier packed object data structures provides challenges in prior art packed object data models. Unlike a conventional JAVA data model in which object instances are separately located in the JAVA heap, in a packed object data model multiple packed objects may share the same underlying data, and the data of one packed object could be contained within another packed object. Therefore, synchronization of packed object data must account for locking on overlapped data regions, a capacity beyond the scope of the built-in synchronization structures of conventional JAVA models.

Figure 4:
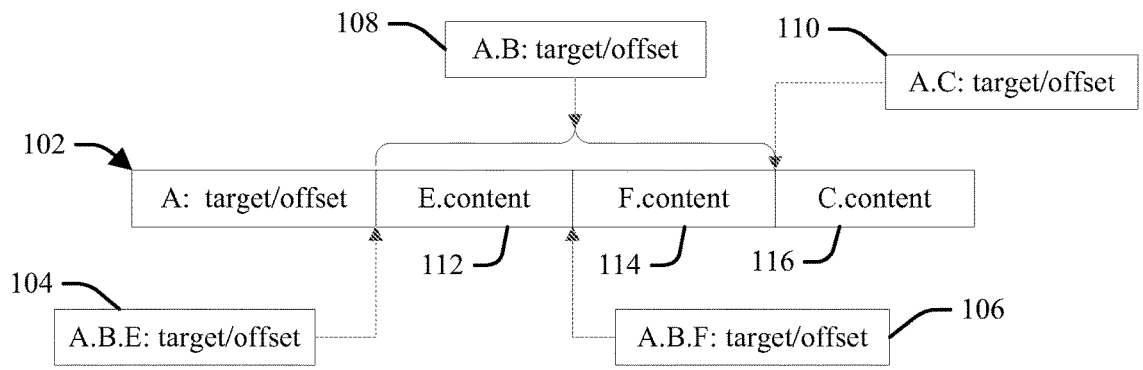
FIG. 4 is a block diagram illustration of a memory layout of a multi-tier packed data object according to the present invention.

FIG. 4 illustrates an illustrative but not limiting or exhaustive example of a memory layout of a three-tier packed data object ("PackedObject") 102 (sometimes hereinafter referred to as "class A" packet). In one example the three-tier packet is defined in JAVA as "PackedObject ClassA, A=newPackedObject(ClassA.class)"). The three-tier packed object 102 is defined by data from a two-tier packed object 108 (sometimes hereinafter referred to as a "Class B" packet), comprising a first portion 112 of child object data from another child class E object ("A.B.E") 104, and a subsequent second portion 114 of data from another child class F object ("A.B.F") 106; and further a data portion 116 from a one-tier packed object ("A.C") 110 ((sometimes hereinafter referred to as a "Class C" packet). Target and offset are two fields of the respective packed object headers, which define the start address of the packed object data, and wherein the length of data plus target/offset identify the packed data region of the respective objects. Thus, the different packed objects A, B, C, E and F refer to same portions of underlying data.

In one example the packed object 102 is defined as follows:

```
//ClassC.java
@Packed public final class ClassC
extends PackedObject
{
  public int content;
}
//ClassB.java
@ImportPacked{"classC" }
@Packed public final class ClassB
extends PackedObject
{
  public ClassC E;
  public ClassC F;
}
//ClassA.java:
@ImportPacked{"ClassB","classC"}
@Packed public final class ClassA
extends PackedObject
{
  public ClassB B;
  public ClassC C;
}
```

Figure 5:
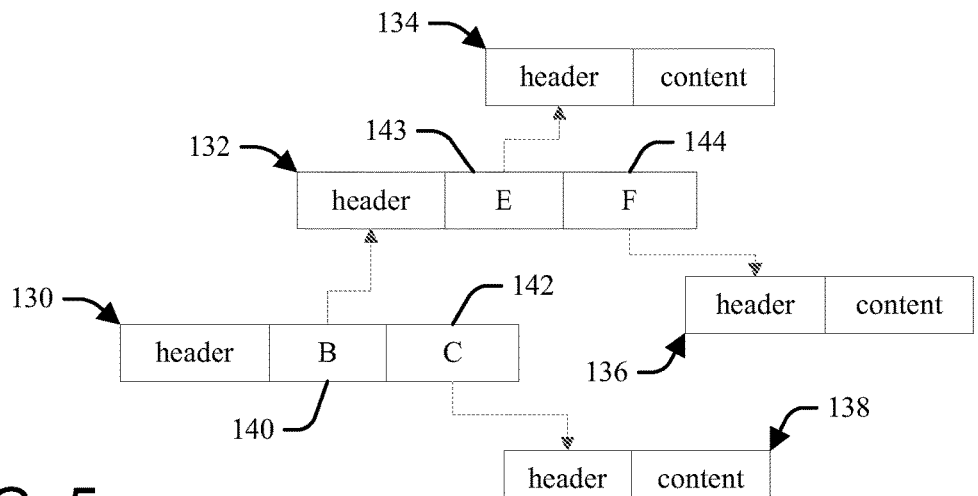
FIG. 5 is a block diagram illustration of a memory layout of a standard JAVA object according to the present invention.

Packed object synchronization can provide coarse grained locking over large chunks of data which might belong to different child packed objects, something not enabled by standard JAVA synchronization. For example, FIG. 5 illustrates a memory layout of standard JAVA object 130. A thread locking object 130 does not prevent other threads from updating the underlying data that is separated in different objects. More particularly, a lock on object 130 does not prevent other threads from engaging the content portion "B" 140 via object 132, sub-content "E" 143 via object 134, sub-content "F" 144 via object 136, or content "C" 142 via object 138, unless each of the other objects 132, 134, 136 and 138 are each locked.

Figure 6:
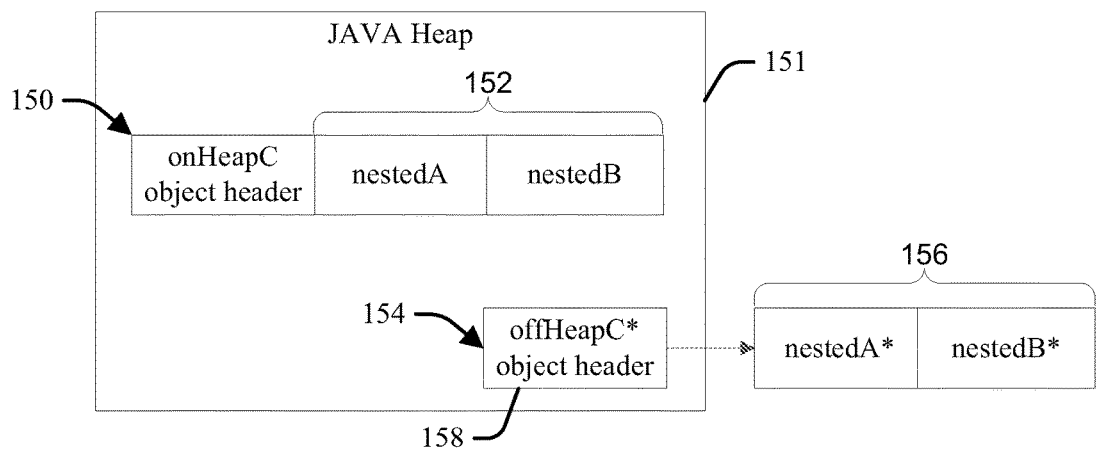
FIG. 6 is a block diagram illustration of on-heap and off-heap memory layouts of a JAVA object according to the present invention.

As illustrated in FIG. 6, a packed object "C"150 may represent data on a JAVA heap 151, such as an "on-heap packed region" 152 comprising "nestedA" and "nestedB" data segments. A packed object "C*"154 may also represent data off of the JAVA heap 151, wherein the object header 158 is located on the heap 151 but points to a native data packed region 156 of data comprising "nestedA*" and "nested*B" data segments that are located outside of the JAVA heap 151.

Consequently, packed data may be accessed by both JAVA code and native code. While it may be necessary to provide a synchronization framework for both the JAVA side and the native side, such a framework is beyond the scope of a conventional JAVA synchronization model.

A linked list of container information shared by all the threads locking on a same multi-tier packed object needs to be concurrently accessed. Lock-based, concurrent linked list approaches taught by the prior art approaches include hand-over-hand locking, optimistic locking and lazy locking. Hand-over-hand locking, also known as lock coupling, adds a lock to each node of the list. When traversing the list of container information, the processors using hand-over-hand locking methods first grab a next node's lock and then release a current node's lock, wherein a target node and its predecessor are always locked before a locking/unlocking operation is carried out on the target node. This approach enables a high degree of concurrency in list operations. However, in practice the overheads of acquiring and releasing locks for each node of a list traversal is prohibitive.

Optimistic locking approaches provide modifications to hand-over-hand approaches that reduce synchronization costs relative to hand-over-hand locking by searching without acquiring locks until a target node is found, then locking predecessor nodes and target node and validating that the locked nodes are correct; if not, the optimistic locking approach releases the locks and starts over. Lazy locking approaches provide further efficiencies over optimistic locking approaches by improving concurrent linked list methodology through the addition of a Boolean marked field in each node to indicate whether that node is in the set. Traversals are thereby enabled that do not need to lock a target node, and there is no need to validate that a node is reachable by traversing a whole list, and the marked field also indicates whether the node is logically or physically deleted.

While conventional, prior art hand-over-hand locking, optimistic locking and lazy locking approaches may reduce synchronization overhead and ensure some degree of concurrency in list operations, synchronization overhead, and overhead associated with starting over when validation fails, still require substantial resources.

JAVA supports mutual exclusion monitor structures that conventionally allow only one thread (computer processor) at a time to execute upon data within a monitored data object associated with a particular monitor. In the prior art, each object has a monitor associated with it, and generally only one thread at a time may hold the lock associated with a monitor. These mutual exclusion data object monitors are conventionally deployed to enable object locks when multiple threads are sharing data or some other resource, thereby enabling multiple threads to independently work on shared data objects individually, and one at a time, without interfering with each other. Thus, monitors enable one thread to execute a monitor region defined for a given data object from beginning to end without another thread concurrently executing the monitor region of the same monitor.

In contrast, in order to synchronize on different data content regions within packed objects that may originate from different objects or other sources, aspects of the present invention associate different portions of data of a packed object to be locked with different monitor construct regions. As shown above, different packed objects may refer to the same underlying data. Therefore, aspects of the present invention identify monitors with the data regions being guarded, instead of to references to the different, respective packed objects.

Figure 7:
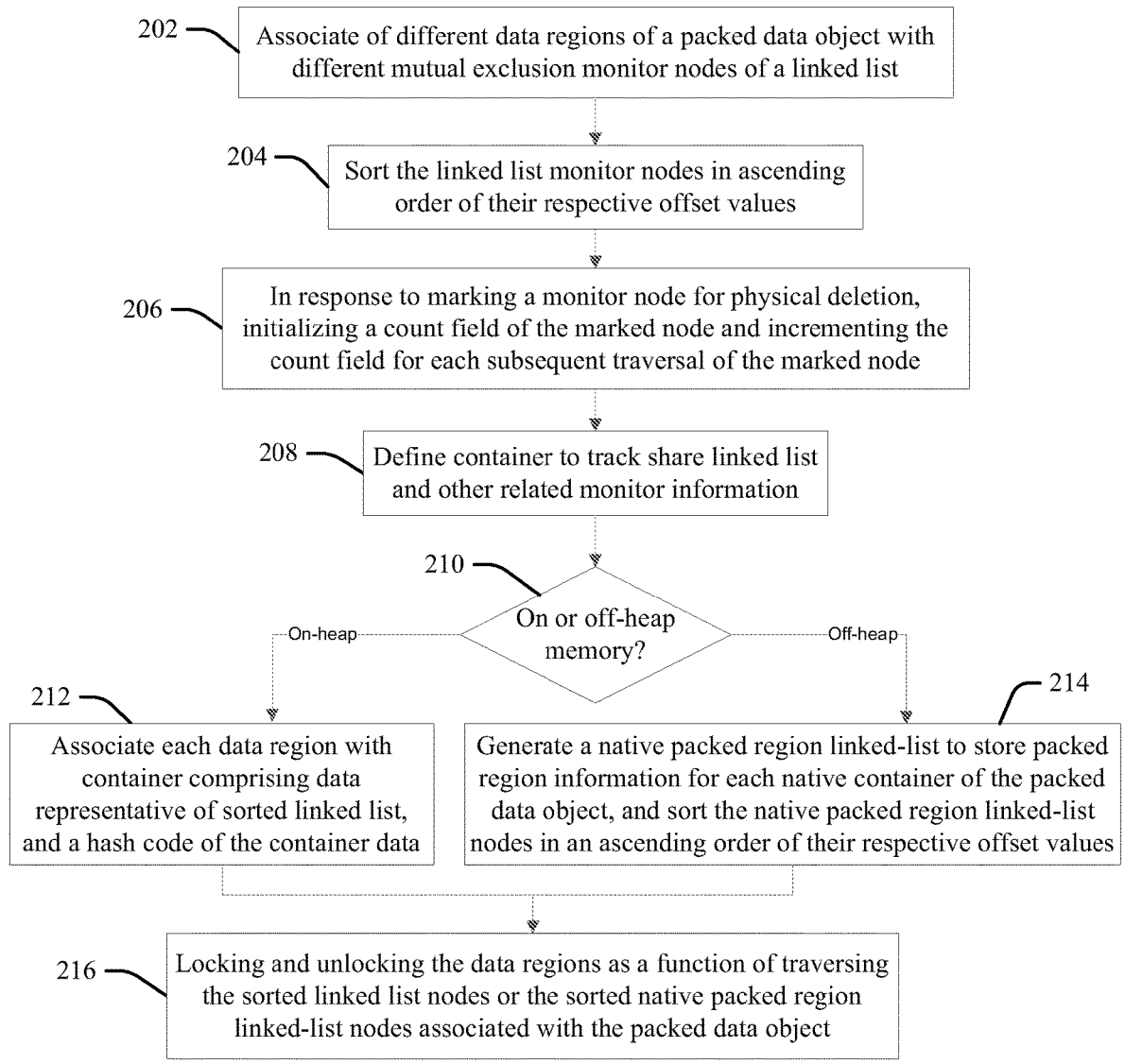
FIG. 7 is a flow chart illustration of an embodiment of the present invention

FIG. 7 illustrates a process or system according to the present invention for multi-tier data synchronization based on a concurrent linked monitor list. At 202 a processor that is configured according to an aspect of the present invention (the "configured processor") associates each of different data regions of a packed data object with different mutual exclusion monitor nodes of a linked list of container information, wherein the data regions are defined by a data offset location of a beginning of each data region within memory data of the packed data object, and a length of the data portion (from the offset location); a locking thread count value that indicates how many threads are currently locking through the monitor; and a marked field that indicates if the monitor node is physically or logically deleted. The configured processor may be implemented in accordance with the computer system server 10 of FIG. 3, including as the cloud node 10 of FIG. 1, as described respectively above.

In one example the packed data object is defined by a "PackedObject" structure that may represent data on either JAVA heap or native memory, wherein the PackedObjects may be categorized as on-heap and off-heap objects (for example, as illustrated in FIG. 6. Some aspects name the packed data area of the container "PackedObject" (the first tier "PackedObject") as "Packed Region," wherein the data regions are defined as "PackedRegions," wherein all the sub-tier packed objects (if any) are contained in the "PackedRegion."

At 204 the configured processor sorts the linked list monitor nodes in ascending order of their respective offset values.

At 206, in response to marking a monitor node for physical deletion, a count field of the node is initialized and incremented for each subsequent traversal of the marked node.

During the process of concurrent programming, multiple threads targeting at the same multi-tier packed object may arbitrarily access the packed object of any tier. The packed object data in different tiers could be overlapped, and one packed object may contain another. Aspects of the present invention generate the linked list of monitor nodes to keep track of the monitor and the information for the data region being synchronized, thereby keeping monitors and information of data regions guarded for locking threads, wherein other incoming threads are enabled to check if the packed data regions they attempt to lock have already been locked by other threads. In one example the linked list of container information generated at 202 via the following "PackedMonitorInfo" structure:

```
typedef struct PackedMonitorInfo{
    UDATA offset;
    UDATA packedLen;
    UDATA lockingThreadCount;
    j9thread_monitor_t monitor;
    U_8   marked;
    I_8   PDCount;//Physical
          deletion count
    j9thread_monitor_t mutex;//for
    lock-based approaches
    struct PackedMonitorInfo
    *next;}PackedMonitorInfo;.
```

In structure definition above "offset" provides the offset location within the chunk of memory of the packed data object of the beginning of a region guarded by an associated monitor node and "packedLen" defines the length of the guarded region. The "lockingThreadCount" indicates how many threads are currently locking through the monitor. The marked field "U_8" indicates if the node is logically deleted. Once the node is marked, "PDCount" is triggered to count the times of traversal before physical deletion.

The JAVA functions "j9thread_monitor_t monitor" and "j9thread_monitor_t mutex" are specific to this particular example; one skilled in the art will appreciate that they may be replace by equivalent JAVA functions or calls appropriate to a specific implementation.

At 208 aspects define a container information structure to keep track of the share linked list of container information and other (monitor) information related with the container. In the present "PackedObject" example, a "ContainerInfo" structure is defined as follows:

```
typedef struct ContainerInfo{
    UDATA container;
    PackedMonitorInfo * monitorList;
    j9thread_monitor_t listMutex;
}ContainerInfo;.
```

Thread processors attempting to lock on the data region of the multi-tier "PackedObject" have to first acquire the "containerInfo" associated with the multi-tier "PackedObject." Whenever a thread is trying to lock on a PackedObject, it needs to first identify the container of that PackedObject, and find the corresponding "containerInfo" for the container "PackedObject.:

The aspect of FIG. 7 bifurcates processing with response to on-heap or off-heap packed data objects at 210. Thus, for on-heap packed objects, at 212 the configured processor associates each packed region of the packed data object ("PackedRegion") with a packed region information structure that contains the container information ("containerInfo") and the hash code of the container (the "PackedObject")." In the present example, a packed region information structure ("PackedRegionInfo") is defined as follows:

```
typedef struct PackedRegionInfo{
    ContainerInfo containerInfo;
    U_32 hash;
} PackedRegionInfo;
```

Thus, according to the structure of the "PackedObject" header, for on-heap "PackedObjects" thread processors are enabled to acquire the object's ("PackedObject") container by accessing the target field of the header, using a hash table (for example, "PackedRegionTable") to map each on-heap container packed object with its "PackedRegionInfo" container. Whenever an on-heap packed object is created, aspects add a "PackedRegionInfo" entry into the "PackedRegionTable" hash table.

With respect to a determination at 210 that the packed data object comprises off-heap, native data, at 214 the configured processor generates a sorted native packed region linked-list to store packed region information for each native container packed object, which includes the data offset locations and data region lengths of the off-heap data regions, wherein the nodes are sorted in ascending order of their respective offset values. As native code may arbitrarily wrap multiple adjacent off-heap packed objects together as one, the "PackedObject" container for off-heap packed objects may be changed. Aspects determine whether a native packed object is contained by another native packed object based upon their native addresses and the lengths of packed data. In the present example, the sorted native packed region linked-list is defined by a "NativePackedRegionInfo" structure as follows:

```
typedef struct NativePackedRegionInfo{
    ContainerInfo containerInfo;
    UDATA nativeAddr;
    UDATA packedDataLen;
    struct NativePackedRegionInfo * next;
} NativePackedRegionInfo;
```

Thus, at 216 the configured processor locks and unlocks the data regions as a function of traversing the sorted linked list nodes or the sorted native packed region linked-list nodes associated with the packed data object.

Figure 8:
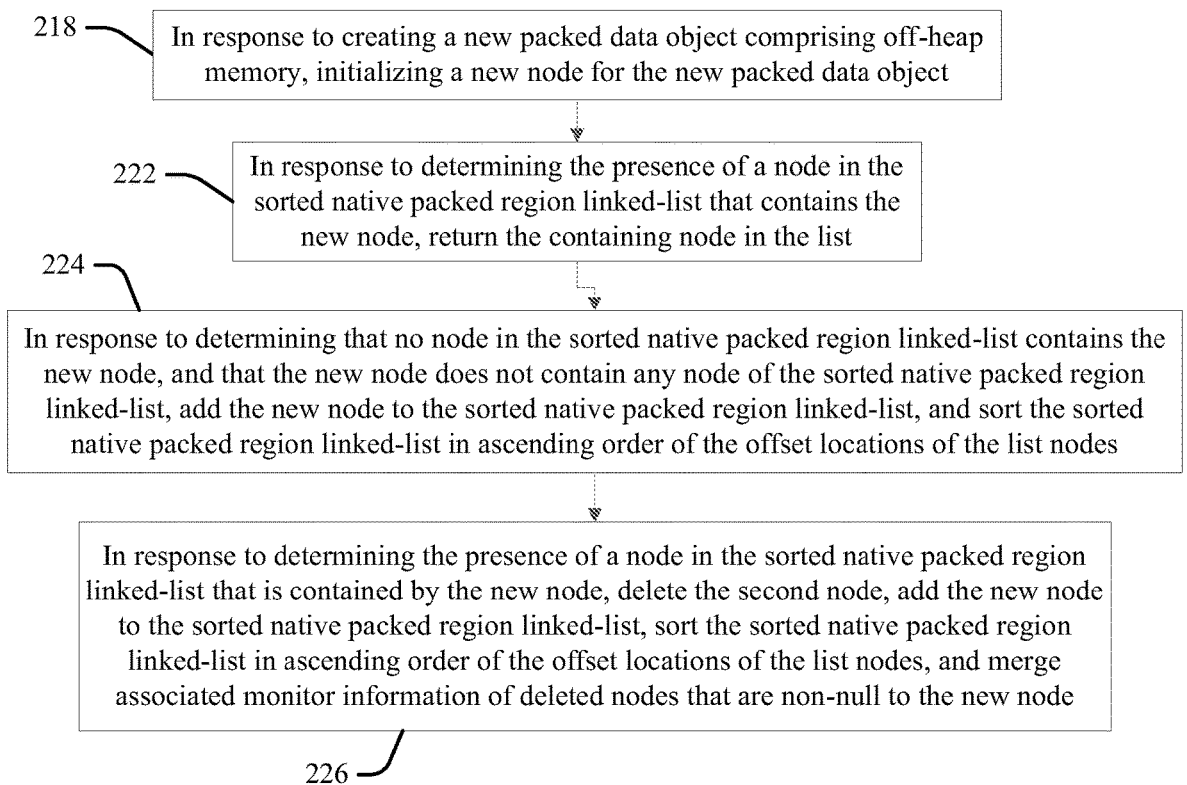
FIG. 8 is a flow chart illustration of another embodiment of the present invention

FIG. 8 illustrates another aspect of the present invention that updates the sorted native packed region linked-list in response to creation or recognition of a new packed data object that includes off-heap, native data. At 218, in response to the creation of a new native data packed object, the configured processor initialize a new node (for example, "newNode") of type "NativePackedRegionInfo" with the "containerInfo" data, the native address and the packed data length of the packed object; and then calls a function (for example, "findContainerUpdateLisq&NativePackedRegionList, newNode)" to either add the new node to the "NativePackedRegionList" linked-list, or to update the linked-list, pursuant to the following:

(i) at 222, in response to determining the presence of a node in the "NativePackedRegionList" linked-list that contains the new node, return the containing node in the list;

(ii) at 224, in response to determining that no node in the "NativePackedRegionList" linked-list contains the new node, and that the new node does not contain any node of the sorted native packed region linked-list, add the new node to the "NativePackedRegionList" linked-list, and the "NativePackedRegionList" linked-list is sorted in ascending order of "NativePackedRegionInfo.nativeAddr" data; and (iii) at 226, in response to determining the presence of nodes in the "NativePackedRegionList" linked-list that are contained by the new node, delete all the nodes being contained by the new node; add the new node to the "NativePackedRegionList" linked-list; sort the "NativePackedRegionList" linked-list in ascending order of "NativePackedRegionInfo .nativeAddr" data; and merge the "monitorLists" of "containerInfo" in each of the deleted nodes that are non-null to the "monitorList" of the new node.

Aspects of the present invention define and implement synchronization interfaces for packed objects. In the present example, the basic synchronization operations of locking and unlocking are represented by "packedLock" and "packedUnlock," respectively. One task of the function "PackedLock (packedObj)" is to acquire the corresponding monitor associated with "packedObj" and call "j9thread_monitor_enter ( )" to enter the monitor, while "PackedUnlock (packedObj)" also finds the corresponding monitor for "packedObj" and releases it by calling "j9thread_monitor_exit( )".

Aspects define and use a function (for example, "getPackedContainerInfo (packedObj)") to fetch the corresponding "containerInfofor packedObj." If packedObj is an on-heap packed object, aspects acquire the "containerInfo" by hashing the target "packedObj" and getting the entry to "PackedRegionTable" for the container "PackedObject." Otherwise, if packedObj is an off-heap packed object, aspects acquire the "containerInfo" by traversing the "NativePackedRegionList" linked-list to find the "NativePackedRegionInfo" for its container "PackedObject."

In one aspect, a "packedLock" process is defined for locking targets, wherein a configured processor gets packed container information by calling "getPackedContainerInfo (packedObj)" to acquire the containerInfo, and traverses the information ("containerInfo→monitorList") to search for the target ("packedMonitorInfo") for locking. In the present example "curMonitor" represents the node being currently traversed.

Thus, the configured processor checks the marked field of the current (traversed) monitor of the found target to determine if the monitor node is physically or logically deleted. In the present example, the value of the marked field indicates if the node is marked as logically deleted (marked=1) or not (marked=0). The value of "PDCount=−1" indicates that the node is physically deleted, and accordingly "curMonitor→PDCount==−1" indicates that the monitor has been physically deleted. If so, the configured processor skips the current node and continues to traverse to the next monitor ("curMonitor→next").

Thus, the node not deleted, or a next, non-deleted node, is locked by the configured processor as the target node, wherein the target node contains the information of a data region that is greater than or equal to the data region of the packed object. The configured processor further double checks "marked" and "PDCount" field values to determine whether it is marked as physically deleted (for example, "curMonitor→PDCount==−1"): if so, the configured processor restarts traversal from a predecessor node of curMonitor if the predecessor node is not null and it is not marked for deletion ("PDCount !=−1"); otherwise, the configured processor starts over from the beginning of the monitorList.

If curMonitor→PDCount !=−1, the configured processor checks if curMonitor→marked==1, which means curMonitor is logically deleted; if so, the configured processor recovers the node to a normal state by resetting the marked value to zero and the PDCount to zero, and then acquires the curMonitor→monitor and calls j9thread_monitor_enter( ) to enter the monitor.

If the traversal does not find a target node in containerInfo→monitorList, the configured processor creates a node PackedMonitorInfo, initializes it with a new monitor and other related information, and finds the spot to insert the new node and keep the monitorList sorted by the PackedMonitorInfo→offset. Before insertion, the configured processor locks the successor (let curr represent it) of the node to be inserted and its predecessor (let pred represent it), and calls a validation function ("validate( )") to make sure that pred is still reachable in the monitorList and pred→next==curr.

If the validation function returns success, the configured processor carries out the insertion operation between pred and curr. Otherwise (if validate( ) returns failure), the configured processor restarts traversal from pred. if pred is not null and pred→PDCount!=−1, and otherwise starts over from the beginning of the monitorList.

One aspect of the present invention defines a "packedUnlock" structure or process, wherein a configured processor calls "getPackedContainerInfo (packedObj)" to acquire the containerInfo, then traverses containerInfo→monitorList to search for the target packedMonitorInfo for unlocking. The configured processor locks each node in containerInfo→monitorList while accessing, then checks if the node being visited (let curMonitor represent it) is physically deleted or not, by checking if curMonitor→PDCount==−1.

If so, the configured processor releases the lock on the node and continues to visit the next node on containerInfo→monitorList.

Otherwise, the configured processor checks if the node is marked. If it is marked, the configured processor increments curMonitor→PDCount by 1. In response to determining that curMonitor→PDCount reaches a predetermined threshold, the configured processor triggers physical deletion for the node. Before physical deletion, which unlinks the node from the containerInfo→monitorList, the configured processor locks pred and curMonitor (let pred point to curMonitor's predecessor node). Since curMonitor is already being locked upon access, the configured processor locks pred and then calls validate( ) to make sure pred is still reachable in containerInfo→monitorList and pred→next==curMonitor.

If validate( ) returns success, the configured processor sets curMonitor→PDCount to −1, unlinks the node from containerInfo→monitorList, and releases the lock on pred and then on curMonitor. After physical deletion is done, the configured processor continues to traverse the next node in containerInfo→monitorList to search for the target PackedMonitorInfo for unlocking.

If validate( ) returns failure, the configured processor starts searching from pred to find the current predecessor for curMonitor if pred is not null and pred→PDCount !=−1; otherwise, the configured processor starts searching from the beginning of the monitorList to locate the current predecessor, and once the predecessor of curMonitor is found, lock the predecessor and calls validate( ) again.

If a target PackedMonitorInfo is found, as the target PackedMonitorInfo is pointed to by curMonitor and is already being locked upon access, then the configured processor sets curMonitor→marked to 1 to indicate that curMonitor is logically deleted, and updates the relevant fields, and acquires curMonitor→monitor and calls j9thread_monitor_exit( ) to exit the monitor. If the target PackedMonitorInfo is not found, the configured processor throws a MONITOR_NOT_FOUND exception.

Thus, aspects of the present invention use a concurrent linked list of container information to keep track of monitor information associated with each multi-tier packed object. Instead of using a hash table to keep monitor constructs associated with particular objects in conventional JAVA synchronization, aspects utilize the linked list to keep the monitors associated with particular packed data regions. Whenever a processor configured to function as a thread attempts to lock on a packed object, the thread processor traverses the linked list of container information and searches for a target node that contains the monitor information. If the target node is not found, the thread processor inserts a new node containing the associated monitor information into the linked list.

When the thread processor attempts to unlock a packed object, the thread processor traverses the linked list of container information and finds the target node, acquires the monitor information therefrom and releases the monitor, and may further delete the node from the linked list in response to determining that the present thread processor is the last one releasing the monitor contained in the node.

In contrast, systems and methods of aspects of the present invention adapt lazy locking methodology to provide synchronization for multi-tier packed objects within concurrent linked lists. Aspects reduce the deletion rate of nodes by postponing a physical deletion phase, as many nodes are most likely to be reused.

Advantages of aspects of the present invention include the following. Unlike prior art lazy locking approaches that carry out physical deletion immediately after a logical deletion, aspects delay physical deletion by setting a threshold, wherein before the threshold is reached a logical deleted node may be returned normal in response to determining a thread processor access for locking. Therefore, the unnecessary repetition of deletion and insertion is avoided.

Unlike a prior art lazy locking approach that starts over from the beginning once validation fails, aspects of the present invention start traversals from a predecessor node before validation failure, to search for a real predecessor node if a previous predecessor is still reachable in the list after validation failure.

Aspects of the present invention also change the locking order from "predecessor→target" to "target→predecessor," in order to ensure that the approach is deadlock-free. This reversed locking order enables a thread processor to backtrack to a predecessor without releasing a lock on the target node, thereby reducing locking overhead.

Physical deletion is only carried out by aspects of the present invention during a traversal by a "packedUnlock" routine. By reducing the deletion rate, the insertion rate is correspondingly decreased, and thereby an overall overhead of insertion and deletion. Further, a related locking overhead that ensures operations are executed correctly are correspondingly decreased.

Synchronization approaches accordingly to aspects of the present invention do not rely on lock-word and hash functions to associate monitor constructs with packed objects, but rather a new and more effective method for management of the associated monitors is provided.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for multi-tier data synchronization based on a concurrent linked monitor list, comprising executing on a computer processor:
    associating each of a plurality of different data regions of a packed data object with different mutual exclusion monitor nodes of a linked list of container information, wherein the data regions are defined by a data offset location of a beginning of each data region within memory data of the packed data object and a length of the data region from the offset location within the memory data of the packed data object;
    sorting the linked list monitor nodes in an ascending order of their respective offset values; and
    locking and unlocking the data regions as a function of traversing the sorted linked list nodes associated with the packed data object.

2. The method of claim 1, further comprising:
    in response to determining that a first of the data regions of the packed data object is on-heap memory, associating the first data region with a container comprising data representative of the sorted linked list, and a hash code of the container data; and
    in response to determining that a second of the data regions of the packed data object is off-heap memory, storing container information for the second data region in the linked list that comprises the data offset location and the data region length of the off-heap one of the second data region, and resorting the linked-list nodes in an ascending order of their respective offset values.

3. The method of claim 1, further comprising:
    in response to creating a new packed data object comprising off-heap memory, initializing a new node for the new packed data object; and
    updating the sorted linked-list by:
    in response to determining a presence of an other node in the sorted linked-list that contains the new node, returning the containing other node;
    in response to determining that no node in the sorted linked-list contains the new node, and that the new node does not contain any node of the sorted linked-list, adding the new node to the sorted linked-list, and resorting the sorted linked-list in ascending order of the offset locations of the linked-list nodes; and
    in response to determining the presence of a second node in the sorted linked-list that is contained by the new node, deleting the second node, adding the new node to the sorted linked-list, resorting the sorted native packed region linked-list in ascending order of the offset locations of the sorted linked-list nodes, and merging associated monitor information of deleted nodes that are non-null to the new node.

4. The method of claim 1, further comprising:
    integrating computer-readable program code into a computer system comprising a processor, a computer readable memory in circuit communication with the processor, and a computer readable storage medium in circuit communication with the processor; and
    wherein the processor executes program code instructions stored on the computer-readable storage medium via the computer readable memory and thereby performs the associating each of the plurality of different data regions of the packed data object with the different mutual exclusion monitor nodes of the linked list of container information, the sorting the linked list monitor nodes in the ascending order of their respective offset values, and the locking and unlocking the data

19 regions as the function of traversing the sorted linked list nodes associated with the packed data object.

5. The method of claim 4, wherein the computer-readable program code is provided as a service in a cloud environment.

6. The method of claim 1, wherein the monitor nodes comprise a locking thread count value that indicates how many threads are currently locking through the monitor, and a marked field that indicates if the monitor node is physically or logically deleted, the method further comprising:
in response to marking a first of the monitor nodes for physical deletion, initializing a count field of the first node and incrementing the count field for each subsequent traversal of the marked first node.

7. The method of claim 6, further comprising:
traversing the linked list of container information to find a target node for locking, wherein the target node comprises container information of an off-heap packed data object that is linked to the linked list;
determining whether the target node is marked as deleted;
in response to determining that the target node is marked as deleted, restarting traversing at a predecessor node of the target node that is not null and not marked for deletion; and
in response to determining that the predecessor node is marked for deletion, restarting traversing from a beginning of the linked list of container information.

8. The method of claim 7, further comprising:
in response to the step of traversing the linked list of container information to find the target node for locking failing to find a non-deleted target node, creating a new target node;
initializing the new target node with a new monitor; and
finding a spot to insert the new target node within the linked list;
locking a successor node and a predecessor node relative to the found spot of the linked list;
calling a validation function to ensure that the predecessor node is still reachable; and
inserting the new node in the found spot in response to a validation from the validation function that the predecessor node is still reachable.

9. The method of claim 6, further comprising:
traversing the linked list of container information to find another target node for unlocking, wherein the another target node comprises container information of an off-heap packed data object that is linked to the linked list;
in response to determining that the another target node is marked for deletion, incrementing the count field of the another target node;
in response to determining that the incremented count field of the another target node reaches a predetermined threshold, triggering a physical deletion of the another target node.

10. The method of claim 9, further comprising:
prior to the step of triggering the physical deletion of the another target node, locking another predecessor node relative to the another target node on the linked list;
calling a validation function to ensure that the another predecessor node is still reachable; and
in response to a validation from the validation function that the another predecessor node is still reachable, marking the another target node for deletion, unlinking the another target node from the container information, and releasing a lock on the another predecessor node and a lock on the another target node.

20

11. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
associates each of a plurality of different data regions of a packed data object with different mutual exclusion monitor nodes of a linked list of container information, wherein the data regions are defined by a data offset location of a beginning of each data region within memory data of the packed data object and a length of the data region from the offset location within the memory data of the packed data object;
sorts the linked list monitor nodes in an ascending order of their respective offset values; and
locks and unlocks the data regions as a function of traversing the sorted linked list nodes associated with the packed data object.

12. The system of claim 11, wherein the processor executes the program instructions stored on the computer-readable storage medium via the computer readable memory and thereby further:
in response to determining that a first of the data regions of the packed data object is on-heap memory, associates the first data region with a container comprising data representative of the sorted linked list, and a hash code of the container data; and
in response to determining that a second of the data regions of the packed data object is off-heap memory, stores container information for the second data region in the linked list that comprises the data offset location and the data region length of the off-heap one of the second data region, and resorts the linked-list nodes in an ascending order of their respective offset values.

13. The system of claim 11, wherein the processor executes the program instructions stored on the computer-readable storage medium via the computer readable memory and thereby further:
in response to creating a new packed data object comprising off-heap memory, initializes a new node for the new packed data object; and
updates the sorted linked-list by:
in response to determining a presence of an other node in the sorted linked-list that contains the new node, returning the containing other node;
in response to determining that no node in the sorted linked-list contains the new node, and that the new node does not contain any node of the sorted linked-list, adding the new node to the sorted linked-list, and resorting the sorted linked-list in ascending order of the offset locations of the linked-list nodes; and
in response to determining the presence of a second node in the sorted linked-list that is contained by the new node, deleting the second node, adding the new node to the sorted linked-list, resorting the sorted native packed region linked-list in ascending order of the offset locations of the sorted linked-list nodes, and merging associated monitor information of deleted nodes that are non-null to the new node.

14. The system of claim 11, wherein the monitor nodes comprise a locking thread count value that indicates how many threads are currently locking through the monitor, and a marked field that indicates if the monitor node is physically or logically deleted; and wherein the processor executes the program instructions stored on the computer-readable storage medium via the computer readable memory and thereby further, in response to marking a first of the monitor nodes for physical deletion, initializes a count field of the first node and increments the count field for each subsequent traversal of the marked first node.

15. The system of claim 11, wherein the processor executes the program instructions stored on the computer-readable storage medium via the computer readable memory and thereby further:

traverses the linked list of container information to find a target node for locking that comprises container information of an off-heap packed data object that is linked to the linked list;

determines whether the target node is marked as deleted;

in response to determining that the target node is marked as deleted, restarts traversing at a predecessor node of the target node that is not null and not marked for deletion; and in response to determining that the predecessor node is marked for deletion, restarts traversing from a beginning of the linked list of container information.

16. The system of claim 15, wherein the processor executes the program instructions stored on the computer-readable storage medium via the computer readable memory and thereby further:

creates a new target node in response to failing to find a non-deleted target node via traversing the linked list of container information to find a target node for locking;

initializes the new target node with a new monitor;

finds a spot to insert the new target node within the linked list;

locks a successor node and a predecessor node relative to the found spot of the linked list;

calls a validation function to ensure that the predecessor node is still reachable; and inserts the new node in the found spot in response to a validation from the validation function that the predecessor node is still reachable.

17. A computer program product for multi-tier data synchronization based on a concurrent linked monitor list, the computer program product comprising:

a computer readable storage medium having computer readable program code embodied therewith, wherein the computer readable storage medium is not a transitory signal per se, the computer readable program code comprising instructions for execution by a processor that cause the processor to:

associate each of a plurality of different data regions of a packed data object with different mutual exclusion monitor nodes of a linked list of container information, wherein the data regions are defined by a data offset location of a beginning of each data region within memory data of the packed data object and a length of the data region from the offset location within the memory data of the packed data object;

sort the linked list monitor nodes in an ascending order of their respective offset values; and lock and unlock the data regions as a function of traversing the sorted linked list nodes associated with the packed data object.

18. The computer program product of claim 17, wherein the computer readable program code instructions for execution by the processor further cause the processor to:

in response to determining that a first of the data regions of the packed data object is on-heap memory, associate the first data region with a container comprising data representative of the sorted linked list, and a hash code of the container data; and in response to determining that a second of the data regions of the packed data object is off-heap memory, store container information for the second data region in the linked list that comprises the data offset location and the data region length of the off-heap one of the second data region, and resorts the linked-list nodes in an ascending order of their respective offset values.

19. The computer program product of claim 17, wherein the computer readable program code instructions for execution by the processor further cause the processor to:

in response to creating a new packed data object comprising off-heap memory, initialize a new node for the new packed data object; and update the sorted linked-list by:

in response to determining a presence of an other node in the sorted linked-list that contains the new node, returning the containing other node;

in response to determining that no node in the sorted linked-list contains the new node, and that the new node does not contain any node of the sorted linked-list, adding the new node to the sorted linked-list, and resorting the sorted linked-list in ascending order of the offset locations of the linked-list nodes; and in response to determining the presence of a second node in the sorted linked-list that is contained by the new node, deleting the second node, adding the new node to the sorted linked-list, resorting the sorted native packed region linked-list in ascending order of the offset locations of the sorted linked-list nodes, and merging associated monitor information of deleted nodes that are non-null to the new node.

20. The computer program product of claim 17, wherein the monitor nodes comprise a locking thread count value that indicates how many threads are currently locking through the monitor, and a marked field that indicates if the monitor node is physically or logically deleted; and wherein the computer readable program code instructions for execution by the processor further cause the processor to, in response to marking a first of the monitor nodes for physical deletion, initialize a count field of the first node and increment the count field for each subsequent traversal of the marked first node.

\* \* \* \* \*